United States Patent
Uchiyama et al.

[11] Patent Number: 5,672,855
[45] Date of Patent: Sep. 30, 1997

[54] CANCELING MECHANISM FOR A VEHICULAR TURN SIGNAL SWITCH

[75] Inventors: Norio Uchiyama; Yoshio Hattori, both of Tokyo, Japan

[73] Assignee: Niles Parts Co., Ltd., Tokyo, Japan

[21] Appl. No.: 631,053

[22] Filed: Apr. 12, 1996

[30] Foreign Application Priority Data

Aug. 7, 1995 [JP] Japan .................................. 7-221075

[51] Int. Cl.⁶ .................................................. B60Q 1/40
[52] U.S. Cl. .................................................. 200/61.3
[58] Field of Search .................. 200/61.3, 61.31, 200/61.32, 61.33, 61.34, 61.35, 406, 8 R, 179; 307/9.1, 10.1

[56] References Cited

FOREIGN PATENT DOCUMENTS 3-68139  7/1991  Japan .

Primary Examiner—Auitya Krishnan
Attorney, Agent, or Firm—Ronald P. Kananen

[57] ABSTRACT

A movable platen 3 is fitted on an end of a lever 4, and pivotally supported by a case 1 and lid 2. A cancel cam 6 is mounted on the movable platen 3, and supported by the lid 2. A cancel pin 7 rotates with a steering shaft 17. A cam guide 5 is mounted on the movable platen 3, and has elastic arms 5b and 5c that contact with the cancel cam 6 when the lever 4 is swung and the cancel pin 7 impinges on the cancel cam 6. The structure of the present invention makes it simple to mount the cam guide by forming the cam guide with an elastic arm that contacts with the cancel cam when the lever is swung.

7 Claims, 3 Drawing Sheets

CANCELING MECHANISM FOR A VEHICULAR TURN SIGNAL SWITCH

BACKGROUND OF THE INVENTION

1. Field of the Invention

The present invention relates generally to switch mechanisms and, in particular, to canceling mechanisms for a turn signal switch of a vehicle that includes a cancel cam, on which a cancel pin rotating with a steering shaft can impinge.

2. Description of the Related Art

A related switch mechanism is disclosed in Japanese Unexamined Utility Model Publication HEI 3-68139, for example, which shows a turn signal switch having a so-called lock relief mechanism. The lock relief mechanism is a mechanism which, when the operating lever is locked by hand in the right or left turn position, and force is applied to turn the steering wheel in the opposite canceling direction, makes the cancel cam on which the cancel pin has impinged move with the guide cam so that the steering wheel can turn. The cam guide is mounted movably on the movable platen and held by a coil spring so as to move with the cancel cam when the cancel pin is pressed excessively.

In the above prior art, however, because the cam guide is supported by the coil spring pressing it against the support portion on the movable platen, the operability is low when the coil spring and cam guide are mounted, and the number of parts increases, resulting in higher costs.

SUMMARY OF THE INVENTION

An object of the present invention is to solve the problems associated with the aforementioned conventional switch assembly.

In order to solve the problems described above, the present invention has an object to make the coil spring unnecessary by forming the cam guide with an elastic arm, and to reduce the number of parts by enabling the cam guide to be easily mounted.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to solve the problems in the prior art, the present invention comprises a vehicular turn signal switch comprising a movable platen fitted to an end of a lever and pivotally supported by a case and a lid, a cam guide mounted on the movable platen, a cancel cam mounted on the movable platen and supported by the lid, and a cancel pin that rotates with a steering shaft, the cam guide has elastic arms for contact with the cancel cam.

The cam guide of this invention may have a center portion and both side portions, each extending from one end of the center portion at a substantially right angle, with both corners circularly curving.

The movable platen of this invention may be formed with a rear support member in contact with the rear side of the cam guide, and a front support member in contact with the front side of the cam guide. The center portion of the cam guide may be interposed between the rear support member and the front support member.

The center portion of the cam guide of this invention may be formed with a projection inserted into, or a recess engaging with the front support member.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE PREFERRED EMBODIMENT

Figure 1:
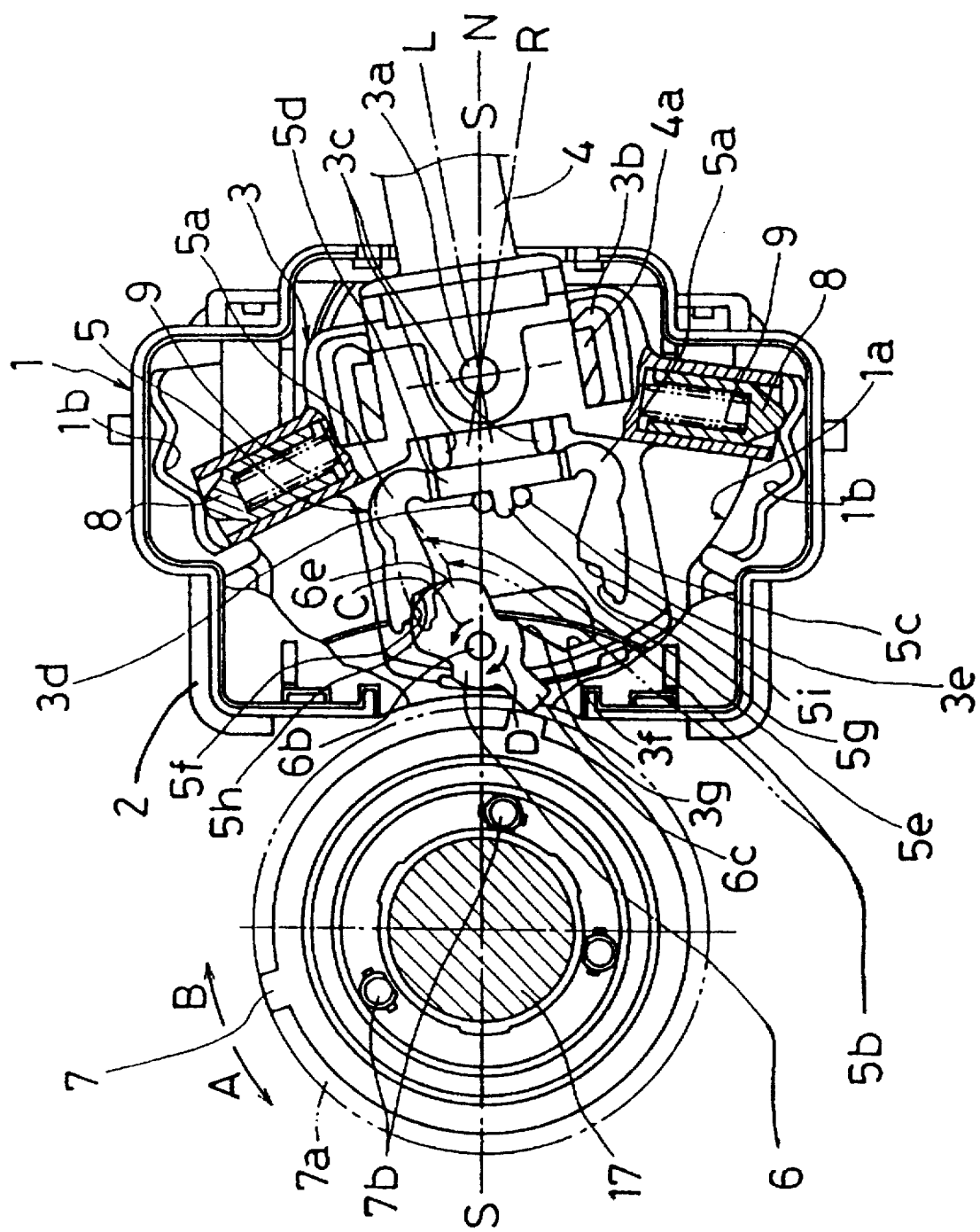
FIG. 1 is a plan view partially in cross section that shows a main portion of the preferred embodiment of the present invention.

A preferred embodiment of the present invention will be described in detail hereinafter with reference to FIGS. 1 to 3 of the accompanying drawings.

A turn signal switch case 1 can be mounted on a base (not shown) fixed to an automobile steering column (not shown). As shown in FIG. 2, the case 1 contains in its lower portion a direction indicator switch device 10, a main/dimmer and passing switch 11, and a light switch device 12. As shown in FIGS. 2 and 3, a lid 2 is fitted on the top of the case 1. Between the case 1 and lid 2, a movable platen 3 is pivotally supported.

The movable platen 3 is located in the cavity 1a of the case 1, and has a pivotal pin 3a projecting upward from its top into the pin hole 2a in the lid 2. The movable platen 3 can pivot around the pivotal pin 3a between a left turn position L and a right turn position R across a shaft line S. The movable platen 3 supports a lever 4 that is pivotally movable in an up and down manner. The pivotal movement of the lever 4 causes pivotal movement of the movable platen 3, which in turn makes the first operating pin 3h operate the direction indicator switch device 10. The movable platen 3 has a cam guide 5 and a cancel cam 6 mounted on its top, rear support members 3c and front support members 3d and 3e projecting from its top, and a bearing recess 3f formed in its top. The movable platen 3 carries on both sides angle-adjusting pins 8 for compressive contact with angle-adjusting grooves 1b by means of springs 9 interposed between the platen 3 and the pins 8.

Figure 2:
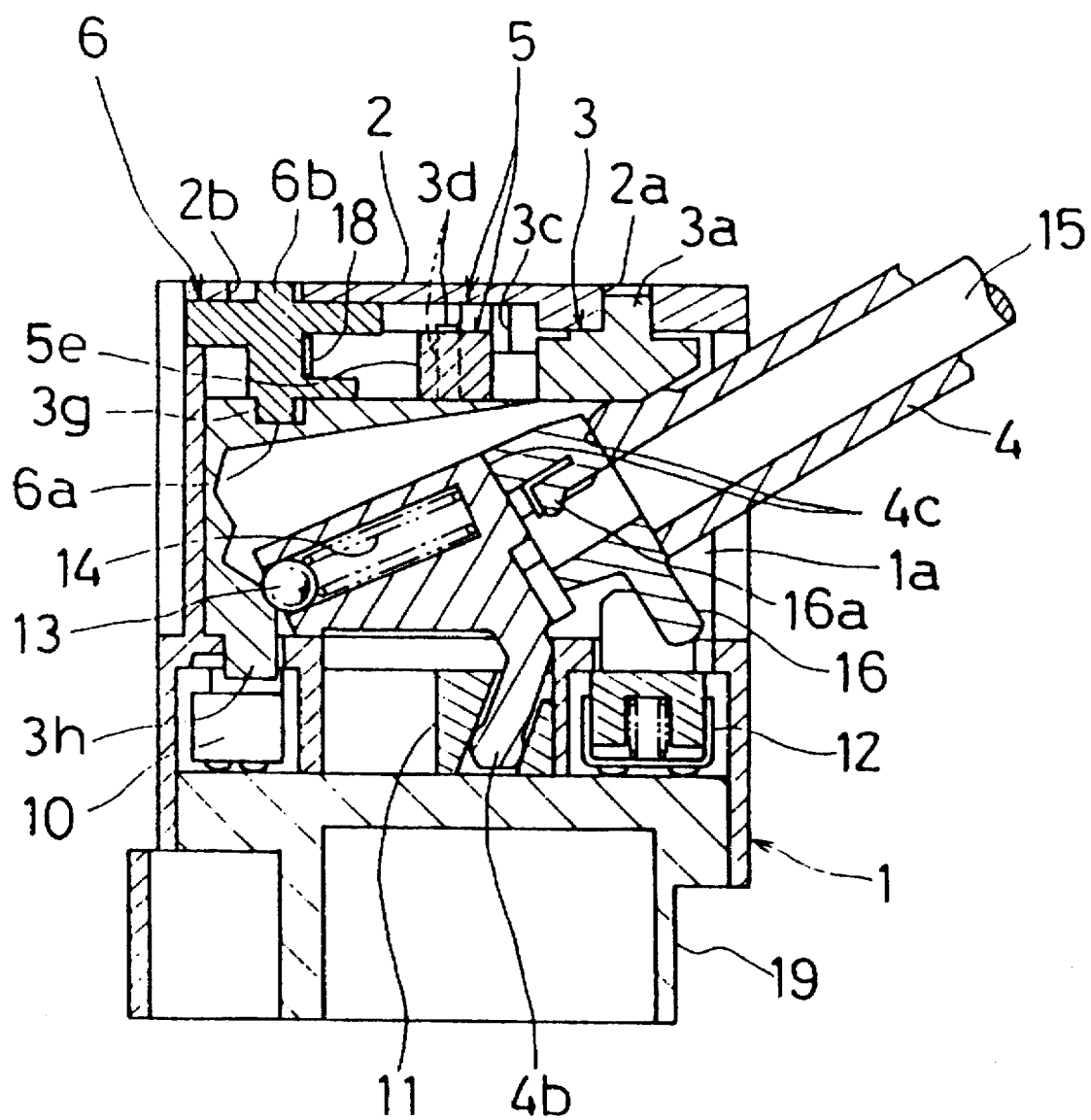
FIG. 2 is an elevational view in central cross section that shows the preferred embodiment of the invention at the neutral position.

As shown in FIGS. 1 and 2, the rear support members 3c are two projections contacting with the rear side of a center portion 5d of the cam guide 5. The number and shape of the projections forming the rear support members 3c are not limited in particular. The rear support members 3c contact with the center portion 5d of the cam guide 5 to stop the cam guide 5 from moving toward the lever 4, and their shape is not limited in particular. For example, the rear support members 3c may be something wall-shaped for contact with the center portion 5d of the cam guide 5.

The center portion 5d has a projection 5e extending between the front support members 3d and 3e. These members contact with the side of the center portion 5d that is adjacent to the cancel pin 7. As shown in FIGS. 1 and 3, the front support members 3d and 3e may be two columnar projections 5e.

The number and shape of the projections forming the front support members 3d and 3e are not limited in particular. For example, the projection 5e may be replaced by a recess, while the front support members 3d and 3e may be replaced by one projection engaging with the recess.

The cancel cam 6 has a slide pin 6a on its bottom that engages movably with the bearing recess 3f. The bearing recess 3f has a mountainlike side wall 3g in its side wall that is adjacent to the cancel pin 7. The mountainlike side wall 3g is a triangular projection that has an apex directed toward the pivotal pin 3a on the shaft line S extending between the pivotal pin 3a of the movable platen 3 and the steering shaft 17.

As shown in FIG. 2, the lever 4 is fitted in the movable platen 3, with a steel ball 13 and a spring 14 inserted into one end of the lever 4. The lever 4 is fitted with a knob or the like (not shown) of the light switch device 12 on its other end. The lever 4 surrounds a shaft 15 supported rotatably. The lever 4 has pins 4a projecting on both sides. The movable platen 3 has elastic bearing members 3b fitted therein that support the pins 4a. The lever 4 can pivot around the pins 4a. The lever 4 has a second operating pin 4b formed on its front end for operating the main/dimmer and passing switch 11. The second operating pin 4b causes the main/dimmer and passing switch 11 to make main/dimmer switching and passing of the headlights.

The lever 4 has a cavity 4c formed near the second operating pin 4b. The shaft 15 extends into the cavity 4c. The third operating pin 16 is inserted into one end of the shaft 15, and fixed by an elastic member 16a. The shaft 15 has a knob fitted on its outer end. By turning the knob, the third operating pin 16 slides and operates the light switch device 12.

The cam guide 5 is interposed between the movable platen 3 and the cancel cam 6 on the shaft line S. The cam guide 5 is held between the movable platen 3 and lid 2, with its center portion 5d placed from above between the rear support members 3c and front support members 3d and 3e. The cam guide 5 is preferably a resinous member that consists of the center portion and both arms, each extending from one end of the center portion at a generally right angle. Both corners 5a of the cam guide 5 circularly curve to add elasticity to the elastic arms 5b and 5c on both sides. The cam guide 5 is kept from moving toward the lever 4 and toward the cancel pin 7, by the rear support members 3c contacting with the rear side of the center portion 5d, and by the front support members 3d and 3e contacting with the front side of the center portion 5d.

The front and rear sides of the cam guide 5 are terms for mere reference, and may be referred to vice versa. The corners 5a of the cam guide 5 may be thinned to make the elastic arms 5b and 5c more elastic.

Figure 3:
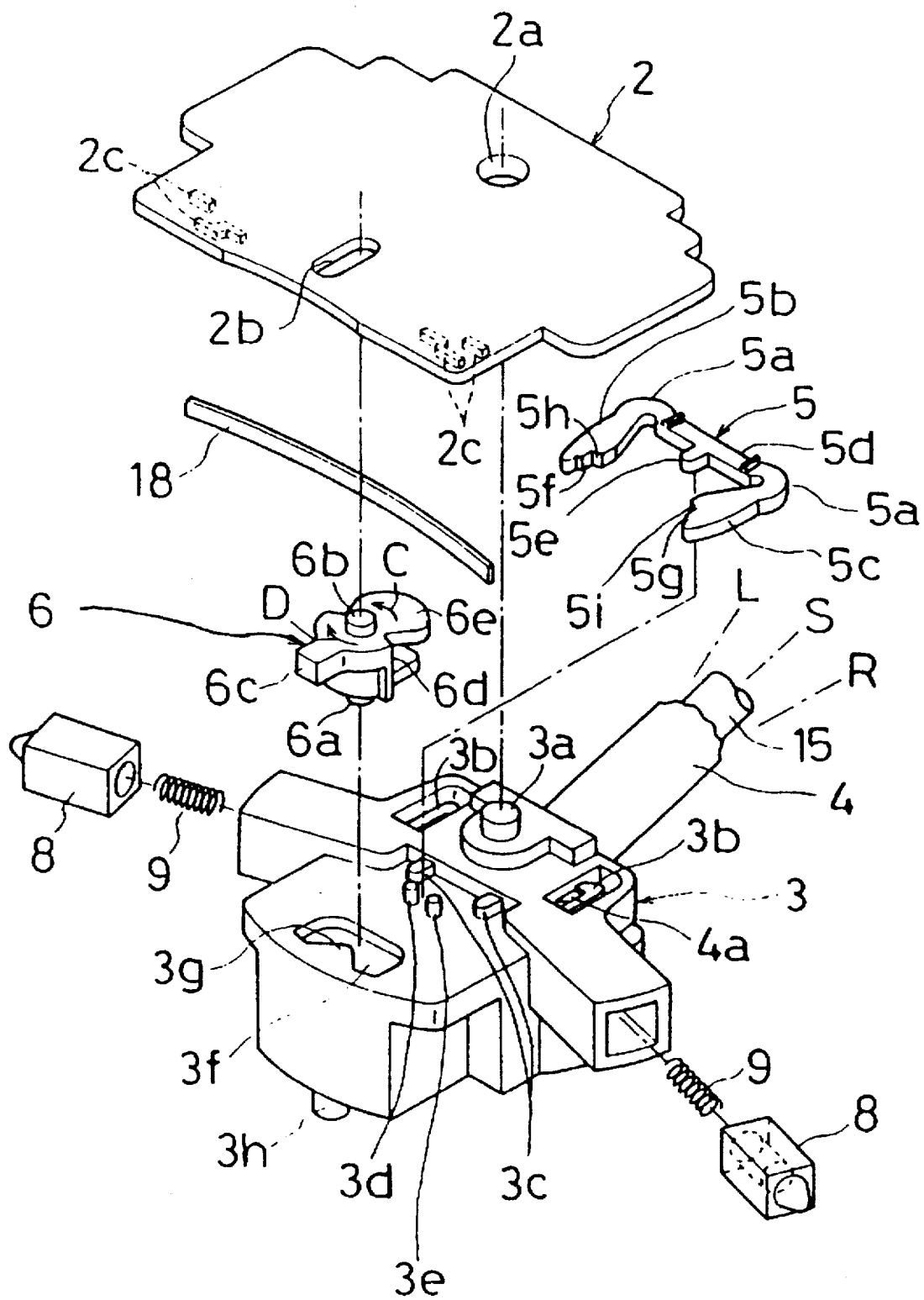
FIG. 3 is an exploded perspective view that shows a main portion of the preferred embodiment of the invention.

As shown in FIGS. 1 and 3, the elastic arms 5b and 5c have contact surfaces 5f, 5g, 5h and 5i formed on the inner sides of their front ends. The contact surfaces define recesses diverging toward the cancel cam 6. The contact surfaces 5f and 5g are inner walls substantially at the front ends of the right and left elastic arms 5b and 5c. The contact surfaces 5f and 5g are formed so as to face the shaft line S. The contact surfaces 5f and 5g are pressed by the press portion 6e when the lever 4 is pivoted to the left turn position L or the right turn position R.

The contact surfaces 5h and 5i extend from the ends of the contact surfaces 5f and 5g that are adjacent to the center portion 5d. The contact surfaces 5h and 5i are formed so as to nearly face the center of the steering shaft 17. The contact surfaces 5h and 5i are pressed by the press portion 6c when the lever 4 is pivoted to the left turn position L or the right turn position R.

The cancel cam 6 is formed integrally with the slide pin 6a, guide pin 6b, impinging portion 6c, groove 6d and press portion 6e. The lower slide pin 6a engages movably with the bearing recess 3f. The upper guide pin 6b is supported in the long hole 2b of the lid 2. The cancel cam 6 is biased by the flat spring 18 so that the slide pin 6a contacts compressively with the mountainlike side wall 3g, and the slide pin 6a is supported slidably on the slopes of the wall 3g.

The guide pin 6b is coaxial with the slide pin 6a. The guide pin 6b is supported in the long hole 2b so that the cancel cam 6 is supported by the lid 2 pivotally and movably in the long hole 2b along the shaft line S. The impinging portion 6c moves into the rotation locus 7a of the cancel pin 7, when the lever 4 is operated to the left turn position L or the right turn position R, to impinge on the cancel pin 7 rotating with the steering shaft 17.

The groove 6d receives a center portion of the flat spring 18. The flat spring 18 urges the slide pin 6a of the cancel cam 6 against the mountainlike side wall 3g. The press portion 6e projects toward the pivot pin 3a of the movable platen 3, and presses the contact surfaces 5f, 5g, 5h and 5i of the cam guide 5 when the lever 4 is operated to the left turn position L and the right turn position R. As shown in FIGS. 1 and 3, the press portion 6e has a curved shape that may be generally circular around a center spaced from the guide pin 6b.

The cancel pin 7 is a rotor rotating with the steering shaft 17, as shown in FIG. 1, and is fitted in the center of the base. Successive projections 7b engage with grooves formed in the steering tongue surface (not shown).

The lid 2 has spring holders 2c projecting on its lower surface on both sides that hold both ends of the flat spring 18. The center portion of the flat spring 18 engages with the groove 6d so that the cancel cam 6 is biased toward the steering shaft 17.

The direction indicator switch device 10, the main/dimmer and passing switch 11, and the light switch device 12 are mounted on the pole plate 19, which is fixed to the lower surface of the case 1.

The present invention is constructed as described above, and the operation is explained in detail below with reference to the accompanying drawings.

When the lever 4 is at the neutral position, the lever 4, movable platen 3, cam guide 5, and cancel cam 6 are symmetric with respect to the shaft line S, as shown in FIG. 1. The slide pin 6a of the cancel cam 6 is located on the apex of the mountainlike side wall 3g, while the impinging portion 6c is out of the rotation locus 7a of the cancel pin 7. The press portion 6e does not contact with the contact surfaces 5f, 5g, 5h and 5i.

If the lever 4 is swung to the left turn position L, as shown in FIG. 1, the lever 4, movable platen 3, and cam guide 5 move to the left turn position L, so that the angle-adjusting pins 8 pass angle-adjusting mountains, compressively contact with the next angle-adjusting recesses 1b, and are held as shown in FIG. 1. As the movable platen 3 has so moved, the slide pin 6a of the cancel cam 6 contacts compressively with the slope of the mountainlike side wall 3g that is adjacent to the elastic arm 5b. As a result, the impinging portion 6c of the cancel cam 6 moves into the rotation locus 7a of the cancel pin 7. As the movable platen 3 has so moved, the press portion 6e contacts with the contact surfaces 5f and 5h of the cam guide 5.

With the parts at the left turn position L, if the steering wheel is turned by more than a fixed angle in the direction of arrow A, the cancel pin 7 turns together in the direction of arrow A and impinges on the impinging portion 6c of the cancel cam 6. The cancel pin 7 pushes the cancel cam 6 and makes it turn in the direction of arrow C. At this time, the press portion 6e slides on the contact surfaces 5f and 5h, while the cam guide 5, movable platen 3, and lever 4 are held at the left turn position L.

While the left turn position L is held by gripping the lever 4, the steering wheel is turned in the canceling direction of arrow B. The cancel pin 7 turns with the steering wheel in the direction of arrow B, and impinges on the impinging portion 6c of the cancel cam 6. The cancel cam 6 turns in the direction of arrow C, as shown in FIGS. 1 and 2. At the same time, the guide pin 6b moves in the long hole 2b toward the pin hole 2a, so that the press portion 6e presses the contact surfaces 5f and 5h. Pressed by the press portion 6e, the contact surfaces 5f and 5h elastically deform so as to widen outward around the corner 5a. The cancel pin 7 can thus pass the impinging portion 6c, while the lever 4 and movable platen 3 can be held at the left turn position L.

When the cancel pin 7 has passed the impinging portion 6c, the elastic arm 5b returns to its original shape and position, pushing the press portion 6e. Biased by the flat spring 18, the cancel cam 6 returns to its original position on the shaft line S. In other words, the cam guide 5 having the elastic arms 5b and 5c functions as a so-called lock relief mechanism for the turn signal switch. Consequently, if the lever 4 is held at the left turn position L, the steering wheel can be turned in the cancel direction of the lever 4.

If the steering wheel is turned in the direction of arrow B when the lever 4 is in the left turn position L, the cancel pin 7 turns together in the direction of arrow B, and impinges on the impinging portion 6c of the cancel cam 6. The cancel cam 6 turns in the direction of arrow C, while the press portion 6e presses the contact surfaces 5f and 5h. As the press portion 6e presses the contact surfaces 5f and 5h, the cam guide 5, movable platen 3, and lever 4 turn around the pivot pin 3a toward the shaft line S, and return to the original neutral position N.

If the lever 4 is swung to the right turn position R, the parts operate in line symmetry opposite the left turn position L of the lever 4. Therefore, the additional explanation is omitted.

It is possible to mount the cam guide 5 only by placing the center portion 5d between the rear support members 3c and the front support members 3d and 3e, placing the projection 5e between the front support members 3d and 3e, and fitting the lid 2 on the movable platen 3. The mounting is thus made relatively simple.

Constructed as stated above, the present invention has the following advantages.

(1) In accordance with the present invention, in a vehicular turn signal switch comprising a movable platen fitted to an end of a lever and pivotally supported by a case and a lid, a cam guide mounted on the movable platen, a cancel cam mounted on the movable platen and supported by the lid, and a cancel pin that rotates with a steering shaft, the cam guide has elastic arms for contact with the cancel cam. Therefore, it is possible to make so-called lock relief for the turn signal switch, make the spring unnecessary, and reduce the number of assembly steps and the number of parts.

(2) In accordance with this invention, the cam guide may have a center portion and a pair of side portions, each extending from one end of the center portion at a substantially right angle, with both corners circularly curving. It is therefore possible to add elasticity to the elastic arms of the cam guide.

(3) In accordance with this invention, the movable platen may be formed with a rear support member in contact with the rear side of the cam guide and a front support member in contact with the front side of the cam guide. The center portion of the cam guide may be interposed between the rear support member and the front support member. It is therefore possible to keep the cam guide from moving horizontally or wobbling.

(4) In accordance with this invention, the center portion of the cam guide may be formed with a projection inserted into, or a recess engaging with the front support member. Therefore, it is possible to fit the cam guide on the movable platen only by putting the center portion of the cam guide between the rear and front support members. Consequently, it becomes simple to mount the cam guide, and easy to automatically mount the cam guide by means of a machine.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

We claim:

1. A canceling mechanism for a vehicular turn signal switch, comprising:
    a movable platen fitted to an end of a lever and pivotally supported by a case and a lid;
    a cam guide mounted on said movable platen;
    a cancel cam mounted on said movable platen and supported by said lid; and
    a cancel pin that rotates with a steering shaft;
    wherein said cam guide has elastic arms for contacting with said cancel cam.

2. The vehicular turn signal switch canceling mechanism according to claim 1, wherein said cam guide has a center portion and first and second side portions, each side portion extending from a respective end of said center portion at a substantially right angle.

3. The vehicular turn signal switch canceling mechanism according to claim 2, wherein respective corners formed between said side portions and said center portion of said cam guide are circularly curving.

4. The vehicular turn signal switch canceling mechanism according to claim 2, wherein said movable platen is formed with rear support members in contact with a rear side of said cam guide and front support members in contact with a front side of said cam guide, and wherein the center portion of said cam guide is interposed between said rear support members and said front support members and held stationary relative to said movable platen.

5. A vehicular turn signal switch canceling mechanism, comprising:
    a movable platen fitted to an end of a lever and pivotally supported by a case and a lid;
    a cam guide mounted on said movable platen;
    a cancel cam mounted on said movable platen and supported by said lid; and
    a cancel pin that rotates with a steering shaft;
    wherein said cam guide has elastic arms for contacting with said cancel cam;
    wherein said movable platen is formed with rear support members in contact with a rear side of said cam guide and front support members in contact with a front side of said cam guide, and wherein the center portion of said cam guide is interposed between said rear support members and said front support members; and
    wherein the center portion of said cam guide is formed with a projection inserted into said front support members.

6. A vehicular turn signal switch canceling mechanism, comprising:

a movable platen fitted to an end of a lever and pivotally supported by a case and a lid;

a cam guide mounted on said movable platen;

a cancel cam mounted on said movable platen and supported by said lid; and a cancel pin that rotates with a steering shaft;

wherein said cam guide has elastic arms for contacting with said cancel cam;

wherein said movable platen is formed with rear support members in contact with a rear side of said cam guide and front support members in contact with a front side of said cam guide, and wherein the center portion of said cam guide is interposed between said rear support members and said front support members; and wherein the center portion of said cam guide is formed with a recess engaging with said front support members.

7. The vehicular turn signal switch canceling mechanism according to claim 1, wherein said cam guide has a center portion, said elastic arms comprise first and second elastic arms each extending from a respective end of said center portion, and said center portion being held stationary relative to said movable platen.

* * * * *